United States Patent
Thomas et al.

(10) Patent No.: US 12,423,429 B2
(45) Date of Patent: Sep. 23, 2025

(54) DYNAMIC DATA FILTERING BASED ON TRUST SCORE WITHIN SERVICE MESH

(71) Applicant: INTERNATIONAL BUSINESS MACHINES CORPORATION, Armonk, NY (US)

(72) Inventors: Binoy Thomas, Kozhikode (IN); Sudheesh S. Kairali, Kozhikode (IN); Malarvizhi Kandasamy, Bangalore (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 146 days.

(21) Appl. No.: 18/355,403

(22) Filed: Jul. 19, 2023

(65) Prior Publication Data
US 2025/0028832 A1 Jan. 23, 2025

(51) Int. Cl.
*G06F 21/00* (2013.01)
*G06F 21/57* (2013.01)

(52) U.S. Cl.
CPC ........ *G06F 21/57* (2013.01); *G06F 2221/033* (2013.01)

(58) Field of Classification Search
CPC .......................... G06F 21/57; G06F 2221/033
See application file for complete search history.

(56) References Cited

U.S. PATENT DOCUMENTS

| | | | |
|---|---|---|---|
| 11,057,393 B2 | 7/2021 | Coffing | |
| 11,057,406 B2 | 7/2021 | Jain | |
| 11,343,231 B2 | 5/2022 | Deshpande | |
| 11,470,159 B2 | 10/2022 | Pang | |
| 11,561,849 B1 | 1/2023 | Kairali | |
| 2013/0239168 A1* | 9/2013 | Sreenivas | G06F 21/57 726/1 |
| 2017/0230349 A1 | 8/2017 | Gaur | |
| 2018/0124018 A1* | 5/2018 | Cascaval | H04L 63/1425 |
| 2021/0135982 A1* | 5/2021 | Chaturmohta | H04L 43/10 |
| 2022/0100858 A1* | 3/2022 | Todd | G06F 21/57 |
| 2022/0116445 A1 | 4/2022 | Filippou | |
| 2023/0077240 A1* | 3/2023 | Sawazaki | H04L 47/122 |

OTHER PUBLICATIONS

Aurthor Unknown, "How do you secure inter-service communication in a microservice architecture"? LinkedIN (2023), downloaded Mar. 20, 2023 from https://www.linkedin.com/advice/0/how-do-you-secure-inter-service-communication, 5 pgs.

(Continued)

*Primary Examiner* — Ghazal B Shehni
(74) *Attorney, Agent, or Firm* — CHIP LAW GROUP

(57) ABSTRACT

A computer-implemented method performs dynamic filtering within a service mesh. While transferring data from one microservice to another microservice, each microservice evaluates a level of trust with each upstream and downstream microservice based on the level of trust score. Each microservice evaluates which data should be filtered while transferring data to downstream microservice and which data should be filtered while receiving data from upstream microservice.

17 Claims, 5 Drawing Sheets

(56) References Cited

OTHER PUBLICATIONS

Aurthor, Unknown, "Service Mesh on Red Hat OpenShift on IBM Cloud", IBM, Cloud Docs, downloaded Apr. 26, 2023 from https://cloud.ibm.com/docs/solution-tutorials?topic=solution-tutorials-openshift-service-mesh, 23 pgs.
Aurthor, Unknown, "Service Mesh on Red Hat OpenShift on IBM Cloud", IBM Cloud (2021), downloaded from https://www.ibm.com/cloud/blog/service-mesh-on-red-hat-openshift on Apr. 26, 2023, 4 pgs.
Takalkar, V. K. et al., "Handling Data Confidentiality Attack due to Data Sharing using Trust-based Approach in Online Social Networks", International Journal of Engineering Research & Technology (IJERT-2015), 4 pgs.
Aurthor, Unknown, "Securing Microservices across Clouds Using Tetrate Service Bridge", downloaded Mar. 20, 2023 from https://tetrate.io/blog/securing-microservices-across-clouds-using-tetrate-service-bridge/#, 20 pgs.

\* cited by examiner

DYNAMIC DATA FILTERING BASED ON TRUST SCORE WITHIN SERVICE MESH

BACKGROUND

Technical Field

The present disclosure generally relates to a service mesh architecture, and more particularly, to data security in the service mesh architecture.

Description of the Related Art

A service mesh is an infrastructure layer built into an application to control service-to-service communication in a microservices environment. The service mesh controls a number of functions, including load balancing, encrypting data, the delivery of service requests to other services, and discovering other services. In the service mesh architecture, a plurality of microservices communicate with each other in a workflow. For example, microservices may be used as a source system that provides different types of data, such as the data generated from IoT devices, the data from applications, and the data flowing through the network. Microservices may also be used for processing the data, or for reporting.

SUMMARY

According to one embodiment, a computer-implemented method performs dynamic filtering within a service mesh. While transferring data from one microservice to another microservice, each microservice evaluates a level of trust with each upstream and downstream microservice based on the level of trust score. Each microservice evaluates which data should be filtered while transferring data to downstream microservice and which data should be filtered while receiving data from upstream microservice.

BRIEF DESCRIPTION OF THE DRAWINGS

The drawings are of illustrative embodiments. They do not illustrate all embodiments. Other embodiments may be used in addition to or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

DETAILED DESCRIPTION

Figure 1:
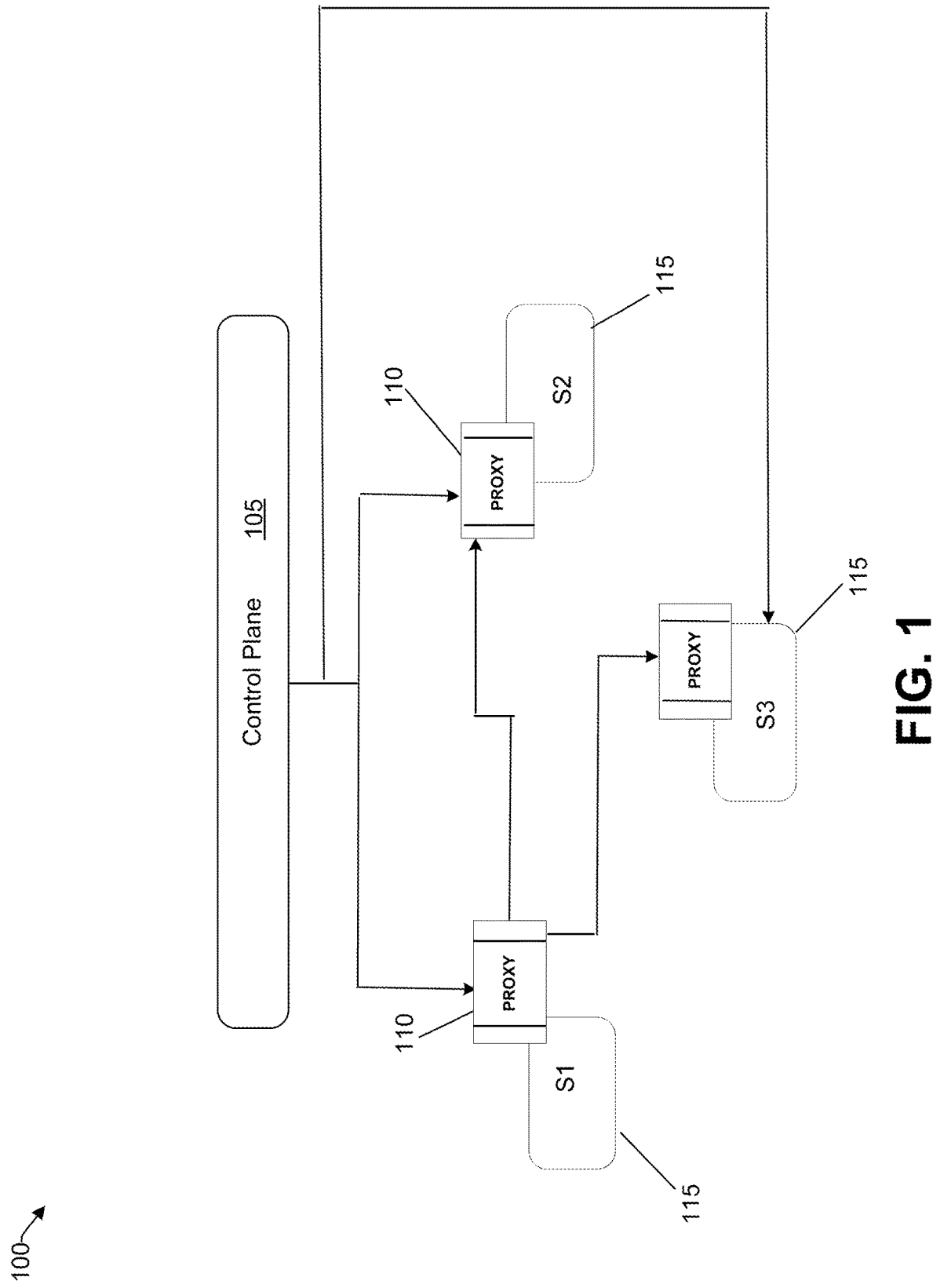
FIG. 1 is an illustration of a control plane and microservice arrangement.

In the following detailed description, numerous specific details are set forth by way of examples to provide a thorough understanding of the relevant teachings. However, it is to be understood that the present teachings may be practiced without such details. In other instances, well-known methods, procedures, components, and/or circuitry have been described at a relatively high-level, without detail, to avoid unnecessarily obscuring aspects of the present teachings. It is also to be understood that the present disclosure is not limited to the depictions in the drawings, as there may be fewer elements or more elements than shown and described.

Although the terms first, second, etc., may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

As used herein, the term "transformer" refers to a type of deep learning model. Transformers distinguish from other types of models by performance of self-attention in each part of input, (including a recursive output). A transformer can be used in natural language processing and computer vision.

It is to be understood that other embodiments may be used and structural or logical changes may be made without departing from the spirit and scope defined by the claims. The description of the embodiments is not limiting. In particular, elements of the embodiments described hereinafter may be combined with elements of different embodiments.

TECHNICAL ADVANTAGES AND SUPPORT

It is to be understood that some of the advantages of the present disclosure are provided herein below. However, a person of ordinary skill in the art will appreciate that additional advantages may exist in addition to those described herein.

In an embodiment, a computer-implemented method of dynamic filtering within a service mesh, the method includes receiving, by a first microservice, a data from one or more upstream microservices. The first microservice evaluates an upstream trust score of the upstream microservices while receiving the data; and the first microservice determines which data is filtered while receiving the data from one or more of the upstream microservices. Security in the network is enhanced for each and every microservice.

In an embodiment, which may be combined with the preceding embodiment, the computer-implemented method further includes evaluating, by the one or more upstream microservices sending the data, a downstream trust score when sending the data downstream to the first microservice, and filtering the data sent downstream. A downstream trust score ensure that data security and confidentiality is not compromised by sending data downstream.

In an embodiment, which may be combined with one or more of the preceding embodiments, the computer implemented method includes that based on an allotted time to increase the upstream trust score and/or the downstream trust score, the filtered data is queued, sent to a different compartment of microservices, and/or rejected with an error when the allotted time expires. These options provide alternative ways to respond to having a trust score that is too low.

In an embodiment, which may be combined with one or more of the preceding embodiments, receiving the filtered data from the one or more upstream microservices after increasing the upstream trust score of the upstream microservices above an upstream threshold value; and sending the filtered data downstream after increasing the downstream trust core above a downstream threshold value. The release of the filtering because a higher rust scored has been obtained ensures network security and encourages upgrading network security.

In an embodiment, a computer-implemented method of dynamic filtering within a service mesh includes identifying a trust score of at least one microservice, sending data to or receiving data from at the least one microservice, filtering the sent or received data when the trust score is below a threshold value, and queuing the filtered data for a predetermined time to determine whether the trust score reaches the threshold value. Security and confidentiality of the data is maintained.

In an embodiment, which can be combined with the preceding embodiment, the computer-implemented method includes processing the sent or received data when the trust score is at or above the threshold value. Security and confidentiality of the data is maintained by requiring a certain value trust score.

In an embodiment, which can be combined with one or more of the preceding embodiments, the computer-implemented method includes filtering the sent or received data by queuing the received data in a buffer. The buffer provides time to update the security by increasing the trust score.

In an embodiment, which can be combined with one or more of the preceding embodiments, the computer-implemented method includes the service mesh notifying a sender that the received data is queued for a predetermined time. The queue permits the sender to obtain a higher trust score so the data can be released from queue.

In an embodiment, which can be combined with one or more of the preceding embodiments, the computer-implemented method includes comprising rejecting the received data in queue unless another trust score is identified at or above the threshold value prior to expiration of the predetermined time. A level of security sufficient to maintain security and integrity of the data is maintained.

In an embodiment, which can be combined with one or more of the preceding embodiments, the computer-implemented method includes: processing the received data in queue from upstream, or forwarding the data downstream in response to receiving another trust score having a value at or above the threshold value prior to expiration of the predetermined time. Data security and confidentiality is maintained.

In an embodiment, which can be combined with one or more of the preceding embodiments, the received data has a plurality of data types with a corresponding trust score for each data type, and the method further includes filtering each data type having its corresponding trust score below the threshold value; and receiving from upstream, or sending downstream, each data type having its corresponding trust score that is at or above the threshold value. Data that meets the threshold values is sent or received, and security of the rejected data is enhanced because a higher trust score is obtained to send or receive the rejected data.

In an embodiment, which can be combined with one or more of the preceding embodiments, in the computer-implemented method includes the at least one microservice from which the data is received is an upstream microservice or a downstream microservice, and the method further includes: receiving from the upstream microservice, or sending to the downstream microservice, each data type having its corresponding trust score that is at or above the threshold value. different trust scores permit different levels of security for the different types of data.

In an embodiment, which can be combined with one or more of the preceding embodiments, the computer-implemented method includes the filtering rejects all of the data received from the at least one microservice. Data security and confidentiality is maintained through the use of trust scores.

In an embodiment, which can be combined with one or more of the preceding embodiments, the computer-implemented method includes the filtering rejects at least some of the data received from the at least one microservice. Different types of data have different security and confidentiality requirements, and the selective passage of some of the data allows efficient operation while the trust score for any queued or rejected data may be increased.

In an embodiment, which can be combined with one or more of the preceding embodiments, the computer-implemented method includes further includes sending a notification to the at least one microservice that the at least some of the data received is rejected. The notification allows the sender to attempt to increase the trust score and not have to retransmit the data.

In an embodiment, a computing device dynamically filters a service mesh. The computing device includes: a processor, a storage device coupled to the processor, the storage device storing instructions to cause the processor to perform acts to provide dynamic filtering, the acts include identifying a trust score of at least one microservice, receiving data from at the least one microservice, and filtering the received data when the trust score is below a threshold value. Data security and confidentiality is enhanced for different types of data.

In an embodiment, which can be combined with the preceding embodiment, the computing device includes instructions that cause the processor to perform an additional act of processing the received data when the trust score is at or above the threshold value. The sufficiently high trust score ensures security and confidentiality in an efficient manner.

In an embodiment, which can be combined with one or more of the preceding embodiments, the computing device includes instructions that cause the processor to perform an additional act of queuing the received data in a buffer. The queuing provides an allotted period of time to obtain an increased trust score.

In an embodiment, which can be combined with one or more of the preceding embodiments, the computing device includes instructions that cause the processor to perform an additional act of notifying a sender that the received data is queued for a predetermined time. Notifying the sending microservice can alert the microservice to attempt to increase the trust score.

In an embodiment, which can be combined with one or more of the preceding embodiments, the computing device includes instructions that cause the processor to perform an additional act of rejecting the received data in queue unless another trust score is identified at or above the threshold value prior to expiration of the predetermined time. Enhanced data security is provided by using the trust scores.

In an embodiment, which can be combined with one or more of the preceding embodiments, the computing device includes instructions that cause the processor to perform additional acts of: providing a corresponding trust score for each data type of the received data, filtering each data type having its corresponding trust score below the threshold value, and receiving from upstream, or sending downstream, each data type having its corresponding trust score that is at or above the threshold value. Different trust scores for different types of data keeps the network optimally protecting the confidentiality and security of the data.

In an embodiment, which can be combined with one or more of the preceding embodiments, the computing device includes instructions that cause the processor to perform additional acts of: receiving from the upstream microservice, or sending to the downstream microservice, each data type having its corresponding trust score that is at or above the threshold value. Enhanced network security and confidentiality results.

In an embodiment, which can be combined with one or more of the preceding embodiments, the instructions cause the processor to perform additional acts of: based on an allotted time to increase the upstream trust score and/or the downstream trust score, the filtered data is queued, sent to a different compartment of microservices, and/or rejected with an error when the allotted time expires. Different options can be selected depending on how much different is the current trust score from a threshold score, the allot time to keep the filtered data in queue, and whether a different compartment of the microservice can receive the data.

Overview

The present disclosure is directed to a computer-implemented method and computer device that performs dynamic filtering within a service mesh. While transferring data from one microservice to another microservice, each microservice evaluates a level of trust with each upstream and downstream microservice based on the level of trust score. Each microservice evaluates which data should be filtered while transferring data to downstream microservice and which data should be filtered while receiving data from upstream microservice. The present disclosure provides an advantage in that different types data from the same client sometimes have different levels of security, and the corresponding security must be operated in the network for each data type. In addition, the source system needs to be trusted, so that data can be transferred through the network. Otherwise, the service mesh should ignore the source system to preserve the security of the service meshes. If the network does not provide sufficient security, the confidential source data should be filtered.

FIG. 1 is a drawing of a control plane and microservice arrangement of a conventional service mesh. A control plane 105 controls a mesh of microservices 115 via a series of proxies 110. The control plane 105 provides each proxy with information regarding which data types may be sent from microservices S1 to S3 (shown in FIG. 1). The control plane 105 may also direct the proxy of S1 to have no exchanges of data with S2.

Figure 2:
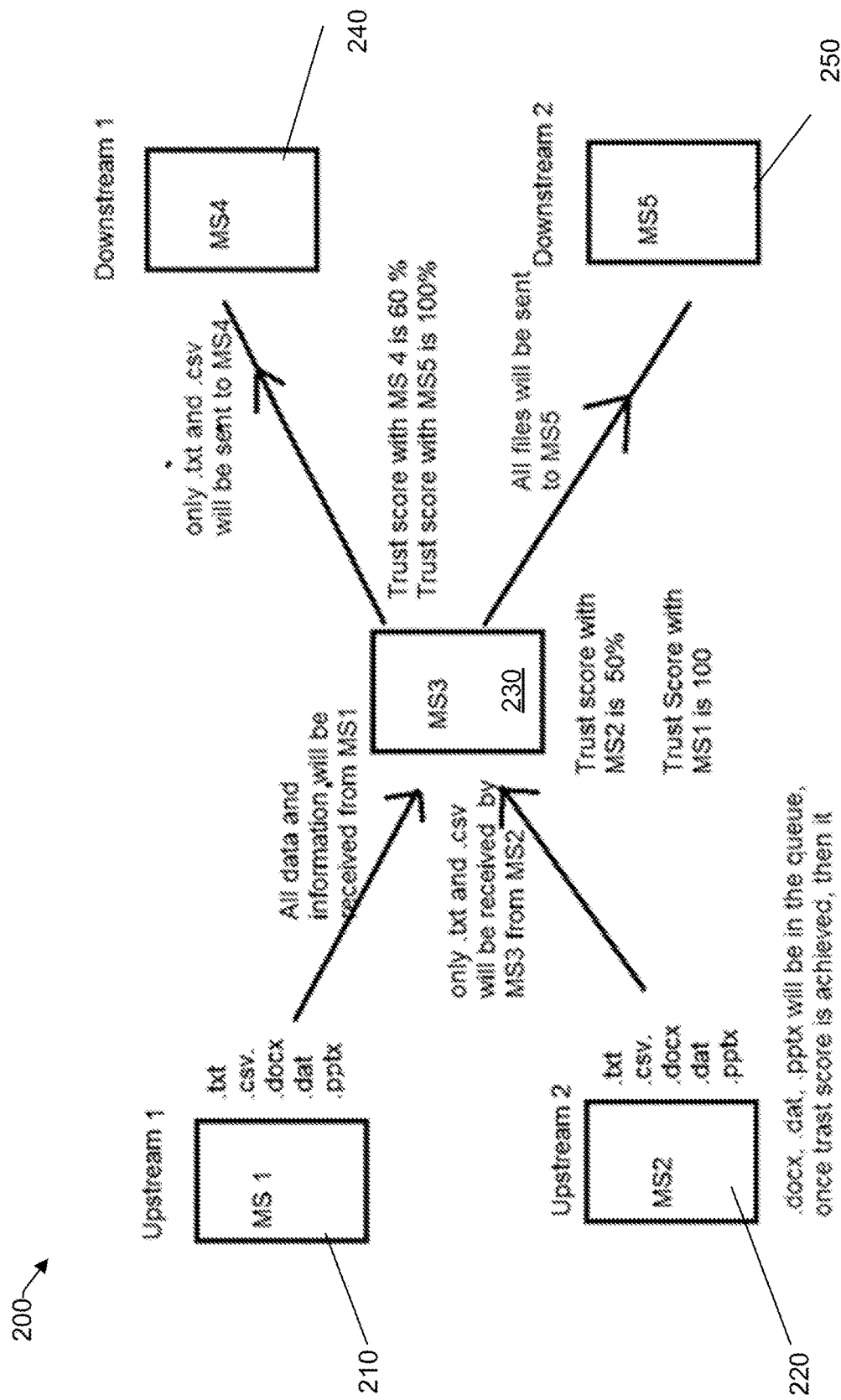
FIG. 2 illustrates a block diagram arrangement of microservices in a service mesh, consistent with an illustrative embodiment.

FIG. 2 illustrates a block diagram arrangement 200 of microservices in a service mesh, consistent with an illustrative embodiment. In this illustrative example, microservices 210, 220, 230, 240, and 250 are arranged as a service mesh. The illustrative embodiment shown in FIG. 2 is an improvement over a system shown in FIG. 1 at least because each and every microservice evaluates a level of trust with each upstream and each downstream data interaction. Based on the level of the trust score, the particular microservice determines which data should be filtered when transferring data to a downstream microservice, and which data should be filtered while receiving the data from an upstream microservice. Through the use of the trust scores, an improvement in computer operations is achieved, as a more secure series of computer operations are performed. The more secure series of computer operations allows for greater efficiency, as some types of data may be sent or received, while preserving the integrity of others.

Referring again to FIG. 2, it is shown that microservice 1 (MS1) 210 has a trust score of 100. Based on the trust score, MS3 230 receives all data and information from MS1 210. Some non-limiting examples of the data being sent from MS1 210 to MS3 230 include txt, csv, docx, dat, and/or pptx. It is to be understood that the trust score can be set at any value desired, so while in this example a trust score of 100% is sufficient to allow receipt of all the data from MS1, the scale may be different for other microservice arrangements.

Microservice 2 (MS2) 220 (shown in FIG. 2) has a trust score of 50%, and based on instructions from a control plane (such as shown in FIG. 1) only txt and csv data will be received by MS3 230 from MS2 220. The docx, dat, and ppt data will be in a queue. Once a particular trust score of MS2 220 is achieved, then the queued data will be sent to microservice 3 (MS3) 230. It should be understood that although MS1 210 has a trust score of 100, MS2 220 may only have to reach a trust score of 80% for the docx, dat and/or pptx data to be sent to MS3. If the trust score of MS2 220 is raised from 50% to 70%, the docx data may be sent but the other data may remain queued.

While MS3 230 has been discussed with reference to upstream services (MS1 210 and MS2 230), MS3 230 also send data downstream to microservice 4 (MS4) 240 and microservice 5 (MS5_250. In a similar manner as explained with regard to the upstream data, the trust score of MS4 240 is 60%, and only txt and csv data is sent downstream to MS4 240 from MS3 230. As the trust score of MS5 250 is 100%, all of the data will be sent to MS5 250. It is to be understood that the term data is to be interpreted broadly and dynamic filtering may be applicable to many categories of data. The data may be grouped into files, chunks, blocks, frames, etc.

Example Embodiment

Figure 3:
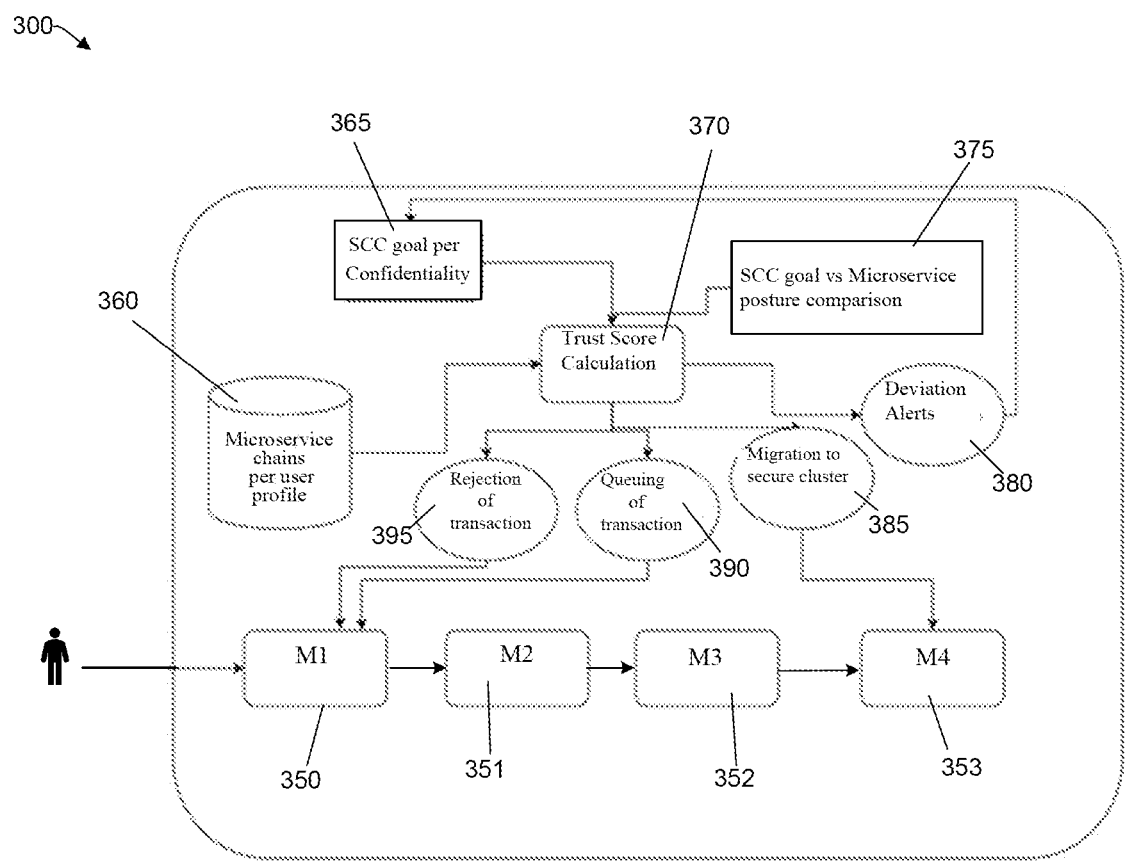
FIG. 3 illustrates an implementation of dynamic filtering, consistent with an illustrative embodiment.

FIG. 3 illustrates an implementation of dynamic filtering based on trust scores within a service mesh 300, consistent with an illustrative embodiment. The computer-implemented method, computing device, and computer program product of the present disclosure may be implemented as an extension to conventional service mesh architecture to improve efficiency and security, among other benefits.

The microservices (M1 350, M2 351, M3 352, M4 353) may be considered a data plane. The rest of the illustration may be considered the control plane, and the instructions to move data, queue data, reject, etc., are performed by the various components shown in FIG. 3.

During this implementation, the service mesh will keep tracking possible microservice chains (M1→M2→M3→M4). The microservice chains per user profile are kept on storage 360.

The service mesh continues identifying the data confidentiality level of each input and out of each microservices M1 350 through M4 353. For example, M1 350 has highly confidential data output such as findings about some security issues of a customer production environment. The Service mesh will have connectivity with SCC 365 (Security and Compliance Center of a cloud) which will have various security controls defined for each confidentiality level. The SCC goal vs microservice posture comparison 375 is used to determine whether the data confidentiality level and security of the processing microservice are matching. The trust score calculation 370 is calculated in part by evaluating the various information including SCC information regarding security and confidentiality.

The service mesh checks whether the data confidentiality level and the security posture of the processing microservice will match. For example, M1 output is highly confidential data output. M2 351 should have multiple layer transport security (MTLS) enabled based on SCC controls, and should not have any vulnerable container images.

It is determined whether SCC goals are achieved and in compliance for the last few hours or so based on the SCC configuration etc.

Trust score calculator 370 will continuously calculate the trust score elements within the same microservice chain. If there is a trust score deviation it will be alerted to the SCC as a GOAL violation. The trust score calculation 370 may result in a number of actions involving the microservices 350-353, such as a rejection of the transaction 395, a queuing of part or all of the transaction 390, a migration to a secure cluster 385, and the issuance of deviation alerts 380.

The service mesh may use a conventional trust score calculation in addition to the SCC goal-based trust calculation according to the present disclosure if there is a need for additional ways to establish trust scores.

If a trust score violation found, the service mesh may try to achieve the security posture (e.g., enable Mutual transport Layer security (MTLS) for a particular data confidentiality level).

Alternatively, the service mesh could "error out" if goal is not achieved within an expected transaction time (based on historical learning expected time to reach target microservice in service chain can be calculated).

If SCC 365 is alerted that M4 353 does not have security measures in that particular cluster—SCC could try to deploy M4 353 in a different cluster where there are adequate security measures (e.g., Network-based Intrusion Detection and Prevention Systems "NIDPS"). In such cases, the automatic migration of service within the service mesh will happen if the service mesh is a multi-cluster service mesh.

Queuing of untrusted transactions: If the M4 353 does not have a trust score, but the SCC is in the process of providing, and it will be achieved well within the service level agreement (SLA) of the original transaction, the M3 352 output will be queued and/or will be sent to M4 353, once M4 353 achieves the trust score or security posture required to achieve the output data.

Alternatively, if a trust score violation is found, the rejection may be fast-forwarded. e.g., M1→M2→M3→M4. If it is found that M4 353 cannot handle highly confidential data coming as ZIP files—as, for example, the M4's anti-virus subscription is expired—M1 350 could block such incoming traffic, even though M1 350 might have capacity to handle such traffic and scans as the traffic is finally expected to reach M4 353.

Example Process

With the foregoing overview of the example architecture, it may be helpful now to consider a high-level discussion of an example process. To that end, FIG. 4 is a flowchart 400 illustrating a computer-implemented method of dynamic filtering based on a trust score, consistent with an illustrative embodiment.

Figure 4:
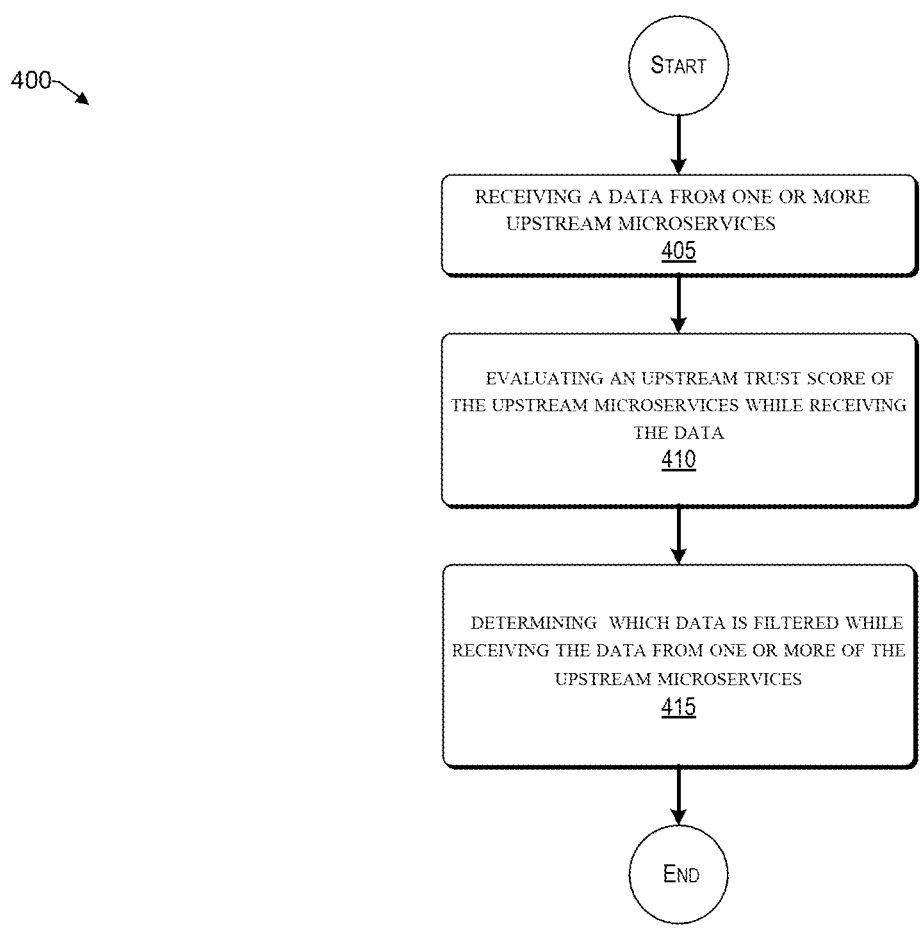
FIG. 4 is a flowchart illustrating a computer-implemented method of dynamic filtering based on a trust score, consistent with an illustrative embodiment.

FIG. 4 is shown as a collection of blocks, in a logical order, which represents a sequence of operations that can be implemented in a combination thereof.

As previously discussed with regard to various embodiments of the present disclosure, a downstream microservice may receive data from one or more upstream services (operation 405). Conversely, a downstream microservice may be sending data to an upstream microservice. FIG. 2 shows some examples of interactions between the microservice in a service mesh.

According to an embodiment of the present disclosure, an upstream trust score is evaluated while the data is being received (operation 410). The trust score is evaluated to determine whether the downstream microservice should process or possibly distribute the received data.

As shown in FIG. 2, certain data may be filtered based on the evaluated trust score (operation 415). For example, certain financial or health data may be queued for a predetermined time until the trust score is increased to a threshold value. Alternatively, the received data may be rejected, or sent to a compartment of another microservice. Typically, a notification is sent to the sending microservice that the trust score is too low, and actions such as security patches, upgrades to certain security versions, etc., may be performed to raise the trust score. These actions may occur during the predetermined time while the data is queued, or may require more extensive actions to raise the trust score.

Although the basic method ends at operation 415, other operations, such as between upstream and downstream microservices, a control plane, and/or a security and compliance module, may be performed.

Importantly, although the operational/functional descriptions described herein may be understandable by the human mind, they are not abstract ideas of the operations/functions divorced from computational implementation of those operations/functions. Rather, the operations/functions represent a specification for an appropriately configured computing device to perform dynamic data filtering based on a trust score. As discussed in detail below, the operational/functional language is to be read in its proper technological context, i.e., as concrete specifications for physical implementations.

Accordingly, one or more of the methodologies discussed herein may obviate a need for time consuming data processing by the user. This may have the technical effect of reducing computing resources used by one or more devices within the system. Examples of such computing resources include, without limitation, processor cycles, network traffic, memory usage, storage space, and power consumption.

It should be appreciated that aspects of the teachings herein are beyond the capability of a human mind. It should also be appreciated that the various embodiments of the subject disclosure described herein can include information that is impossible to obtain manually by an entity, such as a human user. For example, the type, amount, and/or variety of information included in performing the process of dynamic data filtering based on a trust score within a service mesh as discussed herein can be more complex than information that could be reasonably be processed manually by a human user.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 5:
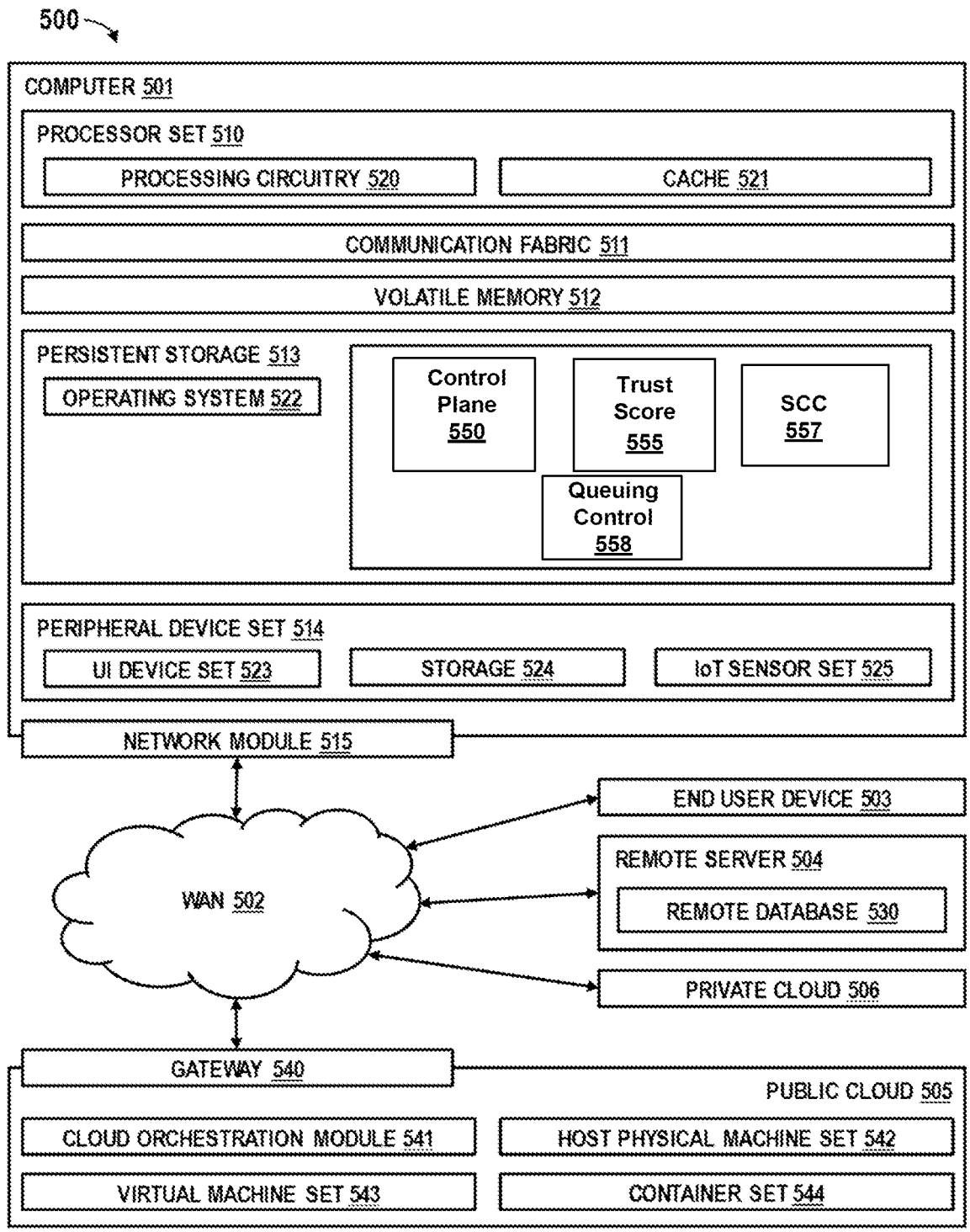
FIG. 5 illustrates a block diagram of a computing environment in accordance with an illustrative embodiment.

With reference to FIG. 5, the computing environment 500 includes an example of an environment for the execution of at least some of the computer code involved in performing the inventive methods. Computer executable instructions in a control plane module 550, a trust score module 555, and Security and Compliance (SCC) module 557 and a queuing control module 558 may be used for dynamic data filter. The control plane module 550 supervisors and directs a data plane, such as a mesh of microservices, to send data (e.g., send data from upstream microservices to downstream microservices). The control plane may direct a filtering of one or more types of data to a queue because of security and confidentiality rules. The trust score module 555 interacts with the control plane module 550 and with the SCC module 557 to evaluates the security rules and compliance requirements. The SCC module 557 may updated by a user to add new and modified security rules, confidentiality rules, etc. Vulnerabilities of the security SCC module may be addressed by, for example, applying patches or security upgrades to increase the trust score of a particular microservice. According to the embodiments of the present disclosure, such modifications to the SCC module 557 may be performed while data is being queued to raise the trust score of a microservice. The queuing control module 558 may queue certain data types (see examples in FIG. 2) that are more sensitive due to financial or personally identifiable information (PII), health information (HIPPA), GDRP data, etc. The queuing control module may dynamically change the data being queued if the trust score goes higher or lower than a predetermined threshold value. The threshold values may be set at different values for different types of data.

In addition, computing environment 500 includes, for example, computer 501, wide area network 502 (WAN), end user device 503 (EUD), remote server 504, public cloud 505, and private cloud 506. In this embodiment, computer 501 includes processor set 510 (including processing circuitry 520 and cache 521), communication fabric 511, volatile memory 512, persistent storage 513 (including operating system 522 and Install Advisor Engine 562, as identified above), peripheral device set 514 (including user interface (UI) device set 523, storage 524, and Internet of Things (IoT) sensor set 525), and network module 565. Remote server 504 includes remote database 530. Public cloud 505 includes gateway 540, cloud orchestration module 541, host physical machine set 542, virtual machine set 543, and container set 544.

Computer 501 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 530. As is well understood in the art of computer technology, and depending upon the technology, performance of a computer-implemented method may be distributed among multiple computers and/ or between multiple locations. On the other hand, in this presentation of computing environment 500, detailed discussion is focused on a single computer, specifically Computer 501, to keep the presentation as simple as possible. Computer 501 may be located in a cloud, even though it is not shown in a cloud in FIG. 5. On the other hand, Computer 501 is not required to be in a cloud except to any extent as may be affirmatively indicated.

Processor set 510 includes one, or more, computer processors of any type now known or to be developed in the future. Processing circuitry 520 may be distributed over multiple packages, for example, multiple, coordinated integrated circuit chips. Processing circuitry 520 may implement multiple processor threads and/or multiple processor cores. Cache 521 is memory that is located in the processor chip package(s) and is typically used for data or code that should be available for rapid access by the threads or cores running on processor set 510. Cache memories are typically organized into multiple levels depending upon relative proximity to the processing circuitry. Alternatively, some, or all, of the cache for the processor set may be located "off chip." In some computing environments, processor set 510 may be designed for working with qubits and performing quantum computing.

Computer readable program instructions are typically loaded onto Computer 501 to cause a series of operational steps to be performed by processor set 510 of Computer 501 and thereby effect a computer-implemented method, such that the instructions thus executed instantiates the methods specified in flowcharts and/or narrative descriptions of computer-implemented methods included in this document (collectively referred to as "the inventive methods"). These computer readable program instructions are stored in various types of computer readable storage media, such as cache 521 and the other storage media discussed below. The program instructions, and associated data, are accessed by processor set 510 to control and direct performance of the inventive methods. In computing environment 500, at least some of the instructions for performing the inventive methods may be stored in the install advisor engine 500 in persistent storage 513.

Communication fabric 511 is the signal conduction path that allows the various components of Computer 501 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 512 is any type of volatile memory now known or to be developed in the future. Examples include dynamic type random access memory (RAM) or static type RAM. Typically, volatile memory 512 is characterized by random access, but this is not required unless affirmatively indicated. In Computer 501, the volatile memory 512 is located in a single package and is internal to Computer 501, but, alternatively or additionally, the volatile memory may be distributed over multiple packages and/or located externally with respect to Computer 501.

Persistent storage 513 is any form of non-volatile storage for computers that is now known or to be developed in the future. The non-volatility of this storage means that the stored data is maintained regardless of whether power is being supplied to Computer 501 and/or directly to persistent storage 513. Persistent storage 513 may be a read only memory (ROM), but typically at least a portion of the persistent storage allows writing of data, deletion of data and re-writing of data. Some familiar forms of persistent storage include magnetic disks and solid-state storage devices. Operating system 522 may take several forms, such as various known proprietary operating systems or open-source Portable Operating System Interface-type operating systems that employ a kernel. The code included in the Install Advisor Engine 500 typically includes at least some of the computer code involved in performing the inventive methods.

Peripheral device set 514 includes the set of peripheral devices of Computer 501. Data communication connections between the peripheral devices and the other components of Computer 501 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 523 may include components such as a display screen, speaker, microphone, wearable devices (such as goggles and smart watches), keyboard, mouse, printer, touchpad, game controllers, and haptic devices. Storage 524 is external storage, such as an external hard drive, or insertable storage, such as an SD card. Storage 524 may be persistent and/or volatile. In some embodiments, storage 524 may take the form of a quantum computing storage device for storing data in the form of qubits. In embodiments where Computer 501 is required to have a large amount of storage (for example, where Computer 501 locally stores and manages a large database) then this storage may be provided by peripheral storage devices designed for storing very large amounts of data, such as a storage area network (SAN) that is shared by multiple, geographically distributed computers. IoT sensor set 525 is made up of sensors that can be used in Internet of Things applications. For example, one sensor may be a thermometer and another sensor may be a motion detector.

Network module 515 is the collection of computer software, hardware, and firmware that allows Computer 501 to communicate with other computers through WAN 502. Network module 515 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 515 are performed on the same physical hardware device. In other embodiments (for example, embodiments that utilize software-defined networking (SDN)), the control functions and the forwarding functions of network module 515 are performed on physically separate devices, such that the control functions manage several different network hardware devices. Computer readable program instructions for performing the inventive methods can typically be downloaded to Computer 501 from an external computer or external storage device through a network adapter card or network interface included in network module 515.

WAN 502 is any wide area network (for example, the internet) capable of communicating computer data over non-local distances by any technology for communicating computer data, now known or to be developed in the future. In some embodiments, the WAN 502 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 503 is any computer system that is used and controlled by an end user (for example, a customer of an enterprise that operates Computer 501) and may take any of the forms discussed above in connection with Computer 501. EUD 503 typically receives helpful and useful data from the operations of Computer 801. For example, in a hypothetical case where Computer 501 is designed to provide a recommendation to an end user, this recommendation would typically be communicated from network module 865 of Computer 501 through WAN 502 to EUD 503. In this way, EUD 803 can display, or otherwise present, the recommendation to an end user. In some embodiments, EUD 803 may be a client device, such as thin client, heavy client, mainframe computer, desktop computer and so on.

Remote server 504 is any computer system that serves at least some data and/or functionality to Computer 501. Remote server 504 may be controlled and used by the same entity that operates Computer 501. Remote server 504 represents the machine(s) that collect and store helpful and useful data for use by other computers, such as Computer 501. For example, in a hypothetical case where Computer 501 is designed and programmed to provide a recommendation based on historical data, then this historical data may be provided to Computer 501 from remote database 530 of remote server 504.

Public cloud 505 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 505 is performed by the computer hardware and/or software of cloud orchestration module 541. The computing resources provided by public cloud 505 are typically implemented by virtual computing environments that run on various computers making up the computers of host physical machine set 542, which is the universe of physical computers in and/or available to public cloud 505. The virtual computing environments (VCEs) typically take the form of virtual machines from virtual machine set 543 and/or containers from container set 544. It is understood that these VCEs may be stored as images and may be transferred among and between the various physical machine hosts, either as images or after instantiation of the VCE. Cloud orchestration module 542 manages the transfer and storage of images, deploys new instantiations of VCEs and manages active instantiations of VCE deployments. Gateway 540 is the collection of computer software, hardware, and firmware that allows public cloud 505 to communicate through WAN 502.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 506 is similar to public cloud 505, except that the computing resources are only available for use by a single enterprise. While private cloud 506 is depicted as being in communication with WAN 502, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 505 and private cloud 506 are both part of a larger hybrid cloud.

CONCLUSION

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications, and variations that fall within the true scope of the present teachings.

The components, operations, steps, features, objects, benefits, and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any such actual relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, the inventive subject matter lies in less than all features of a single disclosed embodiment. Thus, the following claims are hereby incorporated into the Detailed Description, with each claim standing on its own as a separately claimed subject matter.

What is claimed is:

1. A computer-implemented method of dynamic filtering within a service mesh, the method comprising:
   receiving, by a first microservice, a data from one or more upstream microservices;
   evaluating by the first microservice, an upstream trust score of the upstream microservices while receiving the data; and
   determining, by the first microservice, which data is filtered while receiving the data from one or more of the upstream microservices,
   wherein based on an allotted time to increase the upstream trust score and/or a downstream trust score, the filtered data is queued, sent to a different compartment of microservices, and/or rejected with an error when the allotted time expires.

2. The computer-implemented method according to claim 1, further comprising:
   evaluating, by the one or more upstream microservices sending the data, a downstream trust score when sending the data downstream to the first microservice; and
   filtering the data sent downstream.

3. A computer-implemented method of dynamic filtering within a service mesh, the method comprising:
   receiving, by a first microservice, a data from one or more upstream microservices;
   evaluating by the first microservice, an upstream trust score of the upstream microservices while receiving the data;
   determining, by the first microservice, which data is filtered while receiving the data from one or more of the upstream microservices; and
   receiving the filtered data from the one or more upstream microservices after increasing the upstream trust score of the upstream microservices above an upstream threshold value; and
   sending the filtered data downstream after increasing a downstream trust core above a downstream threshold value.

4. A computer implemented method of dynamic filtering within a service mesh comprising:
   identifying a trust score of at least one microservice;
   sending or receiving data from the at least one microservice;
   filtering the sent or received data when the trust score is below a threshold value;
   queuing the filtered data for a predetermined time to determine whether the trust score reaches the threshold value; and
   processing the received data in queue from upstream or forwarding the data downstream in response to obtaining another trust score having a value at or above the threshold value prior to expiration of a predetermined time.

5. The computer-implemented method according to claim 4, further comprising processing the sent or received data when the trust score is at or above the threshold value.

6. The computer-implemented method according to claim 4, wherein filtering the sent or received data comprises queuing the data in a buffer.

7. The computer-implemented method according to claim 4, wherein the service mesh notifies a sender that the data is queued for a predetermined time.

8. The computer-implemented method according to claim 4, further comprising sending the queued data to a different compartment of one of the one or more microservices.

9. The computer-implemented method according to claim 4, wherein the received data comprises a plurality of data types having a corresponding trust score for each data type, and the method further includes:
   filtering each data type having its corresponding trust score below the threshold value; and
   receiving from upstream, or sending downstream, each data type having its corresponding trust score that is at or above the threshold value.

10. The computer-implemented method according to claim 4, wherein the filtering rejects at least some of the data received from the at least one microservice.

11. A computing device that dynamically filters a service mesh, the computing device comprising:
    a processor;
    a storage device coupled to the processor;
    the storage device storing instructions to cause the processor to perform acts to provide dynamic filtering, the acts comprising:
    identifying a trust score of at least one microservice;
    receiving data from at the least one microservice;
    filtering the received data when the trust score is below a threshold value; and
    rejecting the received data in queue unless another trust score is identified at or above the threshold value prior to expiration of the predetermined time.

12. The computing device according to claim 11, wherein the instructions cause the processor to perform an additional act comprising processing the received data when the trust score is at or above the threshold value.

13. The computing device according to claim 11, wherein the instructions cause the processor to perform an additional act comprising queuing the received data in a buffer.

14. The computing device according to claim 11, wherein the instructions cause the processor to perform an additional act comprising notifying a sender that the received data is queued for a predetermined time.

15. The computing device according to claim 11, wherein the instructions cause the processor to perform additional acts comprising:
    providing a corresponding trust score for each data type of the received data;
    filtering each data type having its corresponding trust score below the threshold value; and
    receiving from upstream, or sending downstream, each data type having its corresponding trust score that is at or above the threshold value.

16. The computing device according to claim 11, wherein the instructions cause the processor to perform additional acts comprising receiving from an upstream microservice, or sending to a downstream microservice, each data type having its corresponding trust score that is at or above the threshold value.

17. A computing device that dynamically filters a service mesh, the computing device comprising:
    a processor;
    a storage device coupled to the processor;
    the storage device storing instructions to cause the processor to perform acts to provide dynamic filtering, the acts comprising:
    identifying a trust score of at least one microservice;

receiving data from at the least one microservice;
filtering the received data when the trust score is below a threshold value; and
based on an allotted time to increase the upstream trust score and/or a downstream trust score, queuing the filtered data, sending the filtered data to a different compartment of microservices, and/or rejecting the filtered data and reporting an error when the allotted time expires.

* * * * *